United States Patent Office 3,478,083
Patented Nov. 11, 1969

3,478,083
NOR-ANDROSTENE STEROID DERIVATIVES
Leslie A. Freiberg, Waukegan, Ill., assignor to Abbott Laboratories, North Chicago, Ill., a corporation of Illinois
No Drawing. Filed Feb. 1, 1966, Ser. No. 523,912
Int. Cl. C07c *171/07, 69/74;* A61k *27/00*
U.S. Cl. 260—468.5         7 Claims

ABSTRACT OF THE DISCLOSURE

Steroid analogs of the formula

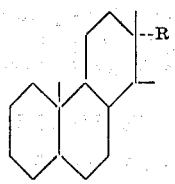

carrying an oxygen function in the 3 - position with R being carboxy, carbalkoxy, acetyl, hydroxymethyl or 2-hydroxy - 2 - propyl are provided through a new process. The new compounds are effective anti-androgens.

---

The present invention is directed to steroid analogs; more particularly it is directed to steroids in which the D-ring is cleaved and wherein the 14-position of the remaining tricyclic structure carries a methyl group.

The new compounds are represented by the formula

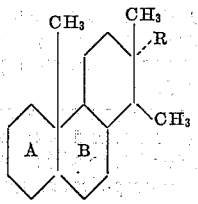

wherein R is selected from the group consisting of carboxy, carboloweralkoxy, acetyl, hydroxymethyl or 2-hydroxy - 2 - propyl, and wherein the A/B rings have a configuration selected from the group consisting of

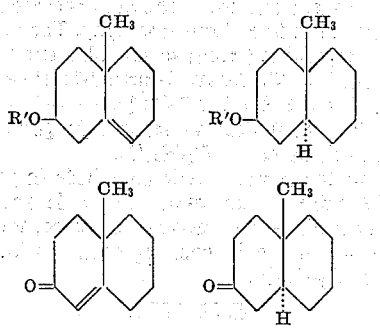

wherein R' is hydrogen or ZCO with Z being a saturated, aliphatic hydrocarbon chain of 1–4 carbon atoms, phenyl, or a loweralkylphenyl. These compounds are useful anti-androgens which do not have the undesirable side effects characteristic of the classical steroid hormones. They are effective as anti-androgens in dosages of from 0.1 to 2.5 mg./kg. in warm-blooded animals, administered subcutaneously as solution or suspension in vegetable oil. Slightly higher dosages are used for oral administration.

The new compounds are made from methyl 3β-acetoxy - 16,17 - seco - 5 - androsten - 16 - oic acid 17-oate (described by Seemann et al. in J. Am. Chem. Soc., vol. 72, p. 4073, 1950 as $\Delta^{9,14}$ - 2,13 - dimethyl - 7β-acetoxydodecahydrophenanthryl - 1 - acetic acid - 2 - carboxylic acid methyl ester), methyl 3β - acetoxy - 16,17-seco - 5α - androstan - 16 - oic acid 17 - oate (described by Cardwell et al. in J. Chem. Soc., p. 361 in 1953 as 3β - acetoxyetioallobilianic acid 17 - methyl ester), methyl 3 - oxo - 16,17 - seco - 4 - androsten-16 - oic acid 17 - oate, or methyl 3 - oxo - 16,17-seco-5α - androstan - 16 - oic acid 17 - oate. The latter oxo compounds are made from the corresponding known diacids by the process of esterification and partial hydrolysis as described by E. B. Herschberg et al. in Arch. Biochem., vol. 19, p. 300 (1948). The other acyloxy esters, defined above, may be used as starting materials; they are prepared by treatment of the known methyl 3β-hydroxy - 16,17 - seco - 5 - androsten - (or 5α - androstan) - 16 - oic acid 17 - oate with an appropriate acid chloride or acid anhydride.

In a general embodiment of the present invention, the compound of formula

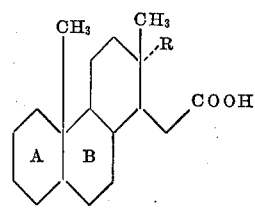

wherein the A/B rings have one of the above-defined partial structures and R' is one of the above-defined acyloxy groups, and wherein R is —COOR", with R" being a saturated, aliphatic hydrocarbon chain of 1–4 carbon atoms, is treated with oxalyl chloride. This forms the corresponding 16-oic acid chloride which is treated with at least one molar equivalent of a compound of the formula R'''OOH wherein R''' is t-alkyl, in an inert organic solvent and in the presence of pyridine, at a temperature of from —10° to 60° C. for at least 30 minutes, isolating the formed t-alkylperoxyester, boiling said ester in cumene for at least 30 minutes, and isolating from the reaction mixture the formed compound of the formula

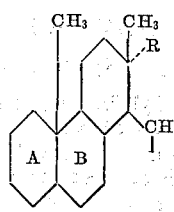

which in turn can be modified in the A/B rings and in R according to known methods. The above reference to an inert, organic solvent is meant to express that the solvent used does not react with any of the coreactants nor with the formed product. Examples of such solvents are benzene, toluene, ethyl ether, tetrahydrofurane and the like.

For specific embodiments of this invention, reference is made to the following examples which are meant as illustrations only. In these examples, any reference to a combination of two solvents in crystallization procedures indicates that the first-named solvent is used to dissolve the product and crystallization is induced or completed by adding the second solvent to the concentrated solution. When two solvents are named followed by a ratio expressed in numbers it signifies that a combination of such solvents is used.

EXAMPLE 1

Methyl 3β-acetoxy-16,17-seco-16-nor-5-androsten-17-oate

To a solution of 10.76 g. of methyl 3β-acetoxy-16,17-seco-5-androsten-16-oic acid 17-oate in 190 ml. of dry benzene is added 19 ml. of oxalyl chloride. The mixture is heated to 65–70° C. for 1.5 hrs. after the initial mild bubbling ceases. The excess oxalyl chloride and the benzene is distilled and the residue is dissolved in 120 ml. of dry benzene. Another 10 ml. of oxalyl chloride is added and the mixture is heated at 65–75° C. for 2 hrs. Again, the excess oxalyl chloride and the benzene are removed by distillation, leaving methyl 3β-acetoxy-16,17-seco-5-androsten-16-oic acid chloride 17-oate.

The crude acid chloride is dissolved in 190 ml. of benzene and 20 ml. of pyridine is added. The mixture is stirred at 10° C. while 20 ml. of t-butylhydroperoxide is added dropwise over a 5-minute period. The mixture is allowed to stand at 25° C. for 18 hrs. and is then diluted with 200 ml. of ether and 200 ml. of water. The organic layer is separated and is washed successively with 0.5 N hydrochloric acid, 10% aqueous potassium hydroxide solution, and water. The organic layer is dried over magnesium sulfate and the solvent is evaporated to give 12.0 g. of 16-t-butylperoxy 17-methyl 3β - acetoxy-16,17-seco-5-androstene-16,17-dioate.

The perester is dissolved in 425 ml. of cumene and the solution is purged with nitrogen for 45 minutes. The mixture is then boiled for 1 hr. after which time the solvent is distilled in vacuum. The residue is dissolved in 35 ml. of benzene and placed on a 500 g. column of activated magnesium silicate. After an initial fraction of tetramethyl-1,2-diphenylethane, methyl 3β-acetoxy-16,17-seco-16-nor-5-androsten-17-oate is eluted with benzene and benzene ethyl ether 20:1. The product is crystallized from methanol/water to give 4.08 g. of methyl 3β-acetoxy-16,17-seco-16-nor-5-androsten-17-oate melting at 133–135° C.; $[\alpha]_D^{28}$ —82.7° (c. 1.06; CHCl$_3$). The analytical values are in good agreement with those calculated for C$_{21}$H$_{32}$O$_4$.

Treatment according to the above example of methyl 3β-benzoxy-16,17-seco-5-androsten-16-oic acid 17-oate or methyl 3 - oxo-16,17-seco-4-androsten-16-oic acid 17-oate leads to methyl 3β-benzoxy-16,17-seco-16-nor5-androsten-17-oate or methyl 3-oxo-16,17-seco-16-nor-4-androsten-17-oate respectively. Similarly, the methyl 3β-p-toluoyloxy- or methyl - 3β-o-toluoyloxy-16,17-seco-5-androsten-16-oic acid 17-oates leads to the methyl 3β-p-toluoyloxy- or the methyl 3β-o-toluoyloxy-16,17-seco-16-nor-5-androsten-17-oates respectively.

EXAMPLE 2

Methyl 3β-hydroxy-16,17-seco-16-nor-5-androsten-17-oate

To 2.00 g. of methyl 3β-acetoxy-16,17-seco-16-nor-5-androsten-17-oate suspended in 50 ml. of methanol is added 2.00 g. of potassium carbonate dissolved in 10 ml. of water. The mixture is refluxed for 3 hrs. and 30 ml. of water is added. The crystalline methyl 3β-hydroxy-16,17-seco-16-nor-5-androsten-17-oate weighs 1.61 g. and melts at 139–140° C.; $[\alpha]_D^{21}$ —83.0° (c. 1.02; CHCl$_3$). The analytical values are in good agreement with those calculated for C$_{19}$H$_{30}$O$_3$.

EXAMPLE 3

3β-hydroxy-16,17-seco-16-nor-5-androsten-17-oic acid

To 500 mg. of methyl 3β-acetoxy-16,17-seco-16-nor-5-androsten-17-oate dissolved in 20 ml. of methanol is added a solution of 6.0 g. of potassium hydroxide in 20 ml. of water. The mixture is refluxed for 48 hrs. and then diluted with 200 ml. of water. Methanol is evaporated under vacuum and the aqueous layer is filtered to obtain a clear solution. This solution is acidified with 9.0 ml. of concentrated hydrochloric acid and the product is extracted with ether. The ether is dried over magnesium sulfate and evaporated. Crystallization from methanol/water gives 280 mg. of 3β-hydroxy-16,17-seco-16-nor-5-androsten17-oic acid which melts at 220.5–222.5° C.; $[\alpha]_D^{27}$ —79.0° (c. 1.08; 95% EtOH. The analytical values are in good agreement with those calculated for C$_{18}$H$_{28}$O$_3$.

EXAMPLE 4

3β,17-dihydroxy-16,17-seco-16-nor-5-androstene

To a refluxing suspension of 291 mg. of lithium aluminum hydride in 50 ml. of diethyl ether is added dropwise during 15 minutes 502 mg. of methyl 3β-acetoxy-16,17-seco-16-nor-5-androsten-17-oate. The mixture is refluxed 18 hrs. and the excess lithium aluminum hydride is decomposed with water saturated ether. The insoluble salts are removed by filtration and washed with ether. The wash liquid and the filtrate are combined and the ether is evaporated leaving 3β,17-dihydroxy-16,17-seco-16-nor-5-androstene, which after crystallization from methanol/water yields 325 mg. of the pure substance melting at 180.5–183.5° C., $[\alpha]_D^{27}$ —95.5° (c. 1.00; 95% EtOH). The analytical values are in good agreement with those calculated for C$_{18}$H$_{30}$O$_2$.

EXAMPLE 5

3β-hydroxy-15,16-seco-5-androsten-17-one

Methyl magnesium bromide is prepared from 15 g. of magnesium and 6.0 g. of methyl bromide in a solvent composed of 110 ml. of diethyl ether and 40 ml. of benzene. To the Grignard reagent at room temperature is added 820 mg. of methyl 3β-acetoxy-16,17-seco-16-nor-androsten-17-oate in 15 ml. of benzene over a period of 30 minutes. After the addition is complete, the mixture is refluxed for 20 hrs. Excess Grignard reagent is decomposed by the cautious addition of 75 ml. of water containing 13 g. of ammonium chloride. The organic layer is separated and washed with water, dried over magnesium sulfate, and evaporated to give 779 mg. of an oil. Chromatography over 120 g. of activated magnesium silicate by elution with benzene/ether 5:1 gives 3β-hydroxy-15,16-seco-5-androsten-17-one which is a polymorphic solvate melting at 97–111° C.

The 3β-acetoxy group can easily be restorted by treating the 3β-hydroxy compound with acetic anhydride and pyridine in known fashion to yield 3β-acetoxy-15,16-seco-5-androsten-17-one of empirical formula C$_{21}$H$_{32}$O$_3$.

EXAMPLE 6

3,17-dihydroxy-17-methyl-15,16-seco-5-androstene

The product of Example 5 is retreated with excess Grignard reagent and the reaction is processed in a similar manner including chromatography. The resulting material is recrystallized from methanol/water to yield 260 mg. of 3β,17 - dihydroxy-17-methyl-15,16-seco-5-androstene, melting at 158.0–160.° C.; $[\alpha]_D^{21}$ —106.3° (c. 1.00; CHCl$_3$). The analytical values are in good agreement with those calculated for C$_{20}$H$_{34}$O$_2$.

Upon treatment with acetic anhydride in pyridine, the above 3β-hydroxy compound yields 3β-acetoxy-17-hydroxy - 17-methyl-15,16-seco-5-androstene, the analytical values of which are in good agreement with those calculated for C$_{22}$H$_{36}$O$_3$.

EXAMPLE 7

Methyl 3-oxo-16-17-seco-16-nor-4-androsten-17-oate

From a mixture of 1.45 g. of methyl 3β-hydroxy-16,17-seco-16-nor-5-androsten-17-oate, 75 ml. of toluene, and 15 ml. of cyclohexanone is distilled 33 ml. of toluene. To the refluxing mixture is added 2.37 g. of aluminum isopropoxide in 35 ml. of toluene during 5 minutes. The mixture is refluxed for 2 hrs., cooled, and 100 ml. of 10% aqueous hydrochloric acid is added dropwise thereto. The mixture is diluted with 100 ml. of ether and the organic phase is washed in series with 10% aqueous potassium hydroxide and water. The ether is distilled and the residue is steam-distilled for 2.5 hrs. The residue is extracted with ether and the extracts are washed in series with 2% aqueous potassium hydroxide solution and water. The ether is dried over magnesium sulfate and evaporated. The residue is crystallized from hexane to give 1.03 g. of methyl 3-oxo-16,17-seco-16-nor-4-androsten-17-oate melting at 140–142° C.; $[\alpha]_D^{21}$ +79.0° (c. 1.04; $CHCl_3$). The analytical values are in good agreement with those calculated for $C_{19}H_{28}O_3$.

EXAMPLE 8

Methyl 3-ethoxy-16,17-seco-16-nor-3,5-androstadien-17-oate

A solution of 806 mg. of methyl 3-oxo-16,17-seco-16-nor-4-androsten-17-oate in a mixture of 10 ml. of dry dioxane, 1.0 ml. of triethylorthoformate, and 0.05 ml. of absolute ethanol is prepared to which is added a mixture of 1.0 ml. of dioxane and 0.05 ml. of concentrated sulfuric acid. After standing at 25° C. for 30 minutes, 2.0 ml. of pyridine is added followed by 150 ml. of ether. The ether solution is washed with 2% potassium hydroxide and water, dried over sodium sulfate, and evaporated. The residue is dried under high vacuum to give 0.90 g. of methyl 3-ethoxy-16,17-seco-16-nor-3,5-androstadien-17-oate. Infrared absorptions are found at 1718, 1651 and 1625 cm.$^{-1}$.

EXAMPLE 9

3-ethoxy-17-hydroxy-16,17-seco-16-nor-3,5-androstadiene

To a suspension of 580 mg. of lithium aluminum hydride in 50 ml. of refluxing ethyl ether is added dropwise during 20 minutes 900 mg. of methyl 3-ethoxy-16,17-seco-16-nor-3,5-androstadien-17-oate in 50 ml. of ether containing one drop of pyridine. The mixture is refluxed for 18 hrs. The excess lithium aluminum hydride is decomposed with water saturated ether. The mixture is filtered to remove insoluble salts which are washed with ether. The combined ether solutions are washed with water, dried over magnesium sulfate and evaporated to give 840 mg. of 3-ethoxy-17-hydroxy-16,17-seco-16-nor-3,5-androstadiene. Infrared absorptions are found at 3625, 1650 and 1622 cm.$^{-1}$.

EXAMPLE 10

3-oxo-17-hydroxy-16,17-seco-16-nor-4-androstene

A homogeneous mixture of 840 mg. of 3-ethoxy-17-hydroxy-16,17-seco-16-nor-3,5-androstadiene, 40 ml. of methanol, and 4.0 ml. of 0.1 N hydrochloric acid is allowed to stand for 16 hrs. at 25° C. Then, 40 ml. of water is added and methanol is evaporated in a vacuum at 25° C. The solid which is obtained is crystallized from methanol/water to give 390 mg. of 3-oxo-17-hydroxy-16,17-seco-16-nor-4-androstene which melts at 154–157° C.; $[\alpha]_D^{21}$ +84.5° (c. 1.03; $CHCl_3$). The analytical values are in good agreement with those calculated for $C_{18}H_{28}O_2$.

EXAMPLE 11

3-oxo-16,17-seco-16-nor-4-androsten-17-oic acid

By following the procedure of Example 3, but using methyl 3-oxo-16,17-seco-16-nor-4-androsten-17-oate as the starting material, 3-oxo-16,17-seco-16-nor-4-androstan-17-oic acid is obtained in a similar yield. The analytical values are in agreement with the calculated values for the compound of empirical formula $C_{18}H_{26}O_3$.

EXAMPLE 12

15,16-seco-4-androsten-3,17-dione

Following the procedure of Example 5, methyl 3-ethoxy-16,17-seco-16-nor-3,5-androstadien-17-oate is converted to 3-ethoxy-15,16-seco-3,5-androstadien-17-one which on treatment according to Example 10 yields 15,16-seco-4-androsten-3,17-dione. The analytical values are in good agreement with those calculated for $C_{19}H_{28}O_2$.

EXAMPLE 13

17-hydroxy-17-methyl-15,16-seco-4-androsten-3-one

Following the procedure of Example 6, methyl 3-ethoxy-16,17-seco-16-nor-3,5-androstadien-17-oate is converted to 17-hydroxy-17-methyl-3-ethoxy-15,16-seco-3,5-androstadiene which on treatment according to Example 10 yields 17-hydroxy-17-methyl-15,16-seco-4-androsten-3-one. The analytical values are in good agreement with those calculated for $C_{20}H_{32}O_2$.

EXAMPLE 14

Methyl 3β-acetoxy-16,17-seco-16-nor-5α-androstan-17-oate

Following the procedure of Example 1, 9.60 g. of methyl 3β-acetoxy-16,17-seco-5α-androstan-16-oic acid 17-oate is converted to 3.53 g. of methyl 3β-acetoxy-16,17-seco-16-nor-5α-androstan-17-oate which melts at 126–127° C.; $[\alpha]_D^{21}$ −15.9 (c. 1.05; $CHCl_3$). The analytical values are in good agreement with those calculated for $C_{21}H_{34}O_4$.

Following the above-named procedure, methyl 3β-benzoxy-16,17-seco-5α-androstan-16-oic acid 17-oate or methyl 3-oxo-16,17-seco-5α-androstan-16-oic acid 17-oate are converted to methyl 3β-benzoxy-16,17-seco-16-nor-5α-androstan-17-oate or methyl 3-oxo-16,17-seco-16-nor-5α-androstan-17-oate, respectively.

EXAMPLE 15

Methyl 3β-hydroxy-16,17-seco-16-nor-5α-androstan-17-oate

Following the procedure of Example 2, methyl 3β-acetoxy-16,17-seco-16-nor-5α-androstan-17-oate is converted to methyl 3β-hydroxy-16,17-seco-16-nor-5α-androstan-17-oate which melts at 171.5–173.5° C.; $[\alpha]_D^{21}$ −6.6° (c. 1.00; $CHCl_3$). The analytical values are in good agreement with those calculated for $C_{19}H_{32}O_3$.

Hydrolysis of this ester in accordance with the procedure of Example 3 produces 3β-hydroxy-16,17-seco-16-nor-5α-androstan-17-oic acid of empirical formula $C_{18}H_{30}O_3$. Upon treatment of the latter with acetic anhydride in the presence of pyridine, 3β-acetoxy-16,17-seco-16-nor-5α-androstan-17-oic acid of formula $C_{20}H_{32}O_4$ is obtained. The analytical values are in good agreement with those calculated.

EXAMPLE 16

3β,17-dihydroxy-16,17-seco-16-nor-5α-androstane

Following the procedure of Example 4, methyl 3β-acetoxy-16,17-seco-16-nor-5α-androstan-17-oate is converted to 3β,17-dihydroxy-16,17-seco-16-nor-5α-androstane which melts at 177–178.5° C.; $[\alpha]_D^{21}$ −18.6° (c. 0.98; $CHCl_3$). The analytical values are in good agreement with $C_{18}H_{32}O_2$.

EXAMPLE 17

3β-hydroxy-15,16-seco-5α-androstan-17-one

Following the procedure of Example 5, methyl 3β-acetoxy-16,17-seco-16-nor-5α-androstan-17-oate is converted to 3β-hydroxy-15,16-seco-5α-androstan-17-one which melts at 150–152.5° C.; $[\alpha]_D^{23}$ −8.1° (c. 1.02; $CHCl_3$). The analytical values are in good agreement with those calculated for $C_{19}H_{32}O_2$.

EXAMPLE 18

3β,17-dihydroxy-17-methyl-15,16-seco-5α-androstane

Following the procedure of Example 6, methyl 3β-acetoxy-16,17-seco-16-nor-5α-androstan-17-oate is converted to 3β,17-dihydroxy-17-methyl-15,16-seco-5α-androstane which melts at 184.5–187.5° C.; $[\alpha]_D^{23}$ −16.3° (c. 1.00; $CHCl_3$). The analytical values are in good agreement with those calculated for $C_{20}H_{36}O_2$.

The corresponding 3β-acetoxy compound is prepared according to standard procedures, using acetic anhydride and pyridine. The 3β-acetoxy-17-hydroxy-17-methyl-15, 16-seco-5α-androstane is obtained in good yield with the analysis in good agreement with $C_{22}H_{38}O_3$.

EXAMPLE 19

Methyl 3-oxo-16,17-seco-16-nor-5α-androstan-17-oate

To a solution of 1.386 g. of methyl 3β-hydroxy-16,17-seco-16-nor-5α-androstan-17-oate in 30 ml. of acetic acid is added dropwise with stirring 1.403 g. of potassium dichromate dissolved in 4.0 ml. of warm water. The mixture is stirred at 25° C. for 18 hrs. and then diluted with 250 ml. of water. The product is isolated by filtration and is washed with water. Crystallization from methanol/water gives 1.01 g. of methyl 3-oxo-16,17-seco-16-nor-5α-androstan-17-oate which melts at 164–166.5° C.; $[\alpha]_D^{21}$ +14.8° (c. 1.00; $CHCl_3$). The analytical values are in good agreement with those calculated for $C_{19}H_{30}O_3$.

EXAMPLE 20

3-oxo-17-hydroxy-16,17-seco-16-nor-5α-androstane

A 928 mg. sample of methyl 3-oxo-16,17-seco-16-nor-5α-androstan-17-oate is dissolved in 70 ml. of anhydrous methanol and 106 mg. of p-toluenesulfonic acid monohydrate is added. The mixture is refluxed for 10 minutes and subsequently cooled to 0° C. in an ice bath. A solution of 1.98 g. of potassium hydroxide in 20 ml. of methanol is dumped into the rapidly stirred mixture, followed by 500 ml. of water. The product is extracted with ether and the ether is washed with water, dried over magnesium sulfate, and evaporated. To remove the last traces of water, the sample is dissolved in benzene and the benzene is evaporated giving 1.11 g. of methyl 3-oxo-16,17-seco-16-nor-5α-androstan-17-oate 3-dimethyl ketal with $[\alpha]_D^{20}$ —1.4° (c. 1.00; $CHCl_3$).

A solution of 1.05 g. of this 17-carbomethoxy compound in 50 ml. of diethyl ether is added dropwise during 5 minutes to a refluxing suspension of 730 mg. of lithium aluminum hydride in 50 ml. of ether. The mixture is refluxed for 15 hrs. The excess lithium aluminum hydride is decomposed with water saturated ether. The ether is filtered to remove insoluble salts which are washed with ether and chloroform. On evaporation of the combined organic solutions, 0.952 g. of 3-oxo-17-hydroxy-16,17-seco-16-nor-5α-androstane 3-dimethyl ketal is obtained.

To a solution of 0.950 g. of this 17-hydroxy compound in 75 ml. of methylene chloride is added 75 ml. of 2 N hydrochloric acid. The mixture is stirred at 28° C. for 4 hrs. The organic layer is separated and the aqueous phase is extracted with 50 ml. of methylene chloride. The combined phases are washed with water, dried over magnesium sulfate, and the methylene chloride is evaporated. The residue is crystallized from acetone/hexane to give 450 mg. of 3-oxo-17-hydroxy-16,17-seco-16-nor-5α-androstane which melts at 153.5–155° C.; $[\alpha]_D^{25}$ +6.8° (c. 1.00; $CHCl_3$). The analytical values are in good agreement with those calculated for $C_{18}H_{30}O_2$.

EXAMPLE 21

3-oxo-16,17-seco-16-nor-5α-androstan-17-oic acid

Following the procedure of Example 3, methyl 3-oxo-16,17-seco-16-nor-5α-androstan-17-oate is converted to 3-oxo-16,17-seco-16-nor-5α-androstan17-oic acid of which the analytical values show good agreement with those calculated from $C_{18}H_{28}O_3$.

EXAMPLE 22

15,16-seco-5α-androstane-3,17-dione

Following the procedure of Example 5, the methyl 3-oxo-16,17-seco-16-nor-5α-androstan-17-oate 3-dimethyl ketal is converted to 15,16-seco-5α-androstane-3,17-dione 3-dimethyl ketal which upon treatment according to the last step which in Example 20 yields 15,16-seco-5α-androstane-3,17-dione. The analytical values are in good agreement with those calculated for $C_{19}H_{30}O_2$.

EXAMPLE 23

17-hydroxy-17-methyl-15,16-seco-5α-androstan-3-one

Following the procedure of Example 6, methyl 3-oxo-16,17-seco-16-nor-5α-androstan-17 - oate 3-dimethyl ketal is converted to 17 - hydroxy - 17 - methyl-15,16-seco-5α-androstan-3-one 3-one 3-dimethyl ketal which on treatment according to the last step shown in Example 20 yields 17 - hydroxy-17-methyl-15,16-seco-5α-androstan-3-one, showing good agreement with the values calculated for $C_{20}H_{34}O_2$.

It will be appreciated by those skilled in the art that the starting materials used in the process of the present invention may carry at the 3-position various acyloxy groups or a keto-group, and that the 5-position may carry a hydrogen atom or a double bond connecting either to the 4- or the 6-position. These starting materials, known from the references given above, can be converted to the corresponding acid chlorides as described by Seemann et al., J. Am. Chem. Soc., vol. 72, p. 4073 (1950) which in turn can be treated with organic peroxides in any of numerous inert organic solvents. Among the organic peroxides, the tertiary butylhydroperoxide is preferred mainly because of its commercial availability. Other organic peroxides such as t-amylhydroperoxide are equally well-suited for the preparation of the intermediate peroxy compounds. The condensation reaction with the organic peroxide may be carried out at room temperature for a period of at least 30 minutes but for complete conversion, it is preferred to use somewhat elevated temperatures and/or longer reaction periods.

Others may practice the invention in any of the numerous ways which will be suggested to one skilled in the art by the present disclosure. All such practice of the invention is considered to be a part hereof provided it falls within the scope of the appended claims.

I claim:
1. The process of treating a compound of the formula

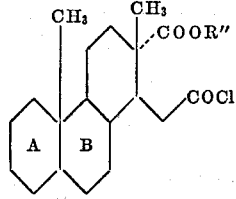

wherein the A/B rings have a configuration selected from the group consisting of

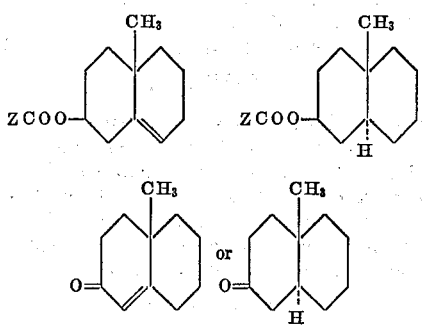

wherein Z is a saturated, aliphatic hydrocarbon chain of 1–4 carbon atoms, phenyl, or loweralkylphenyl, and wherein R" is a saturated, aliphatic hydrocarbon chain of 1–4 carbons, with at least one molar equivalent of a compound of the formula R'''OOH with R''' being t-alkyl, in an inert, organic solvent and in the presence of pyridine at a temperature of from −10° to 60° C. for at least 30 minutes, isolating the formed alkylperoxy ester, boiling said ester in cumene for at least 30 minutes, and isolating from the reaction mixture the formed compound of the formula

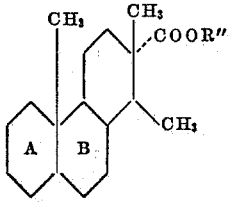

wherein the A/B ring configuration, R' and R'' are as defined above.

2. The process of claim 1 wherein said compound of formula R'''OOH is t-butylhydroperoxide.

3. The process of claim 1 wherein said inert organic solvent is benzene.

4. A compound of the formula

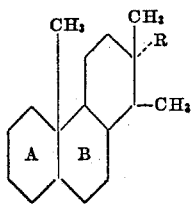

wherein R is selected from the group consisting of carboxy, carboloweralkoxy, acetyl, hydroxymethyl and 2-hydroxy-2-propyl, and wherein the A/B rings have a configuration selected from the group consisting of

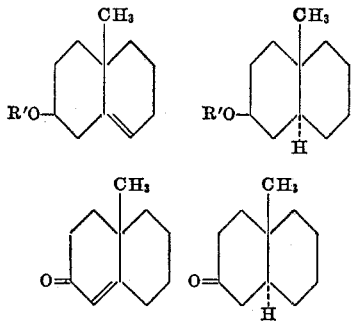

wherein R' is hydrogen or ZCO with Z being a saturated, aliphatic hydrocarbon chain of 1–4 carbon atoms, phenyl, or a loweralkylphenyl.

5. The compound of claim 4 wherein R is carbomethoxy, R' is acetyl and the 5-position carries hydrogen.

6. The compound of claim 4 wherein R is 2-hydroxy-2-propyl, R' is hydrogen, and the 5-position carries a double bond connecting to 6.

7. The compound of claim 4 wherein R is carbomethoxy, the 3-position carries oxygen, and the 5-position carries a hydrogen atom.

References Cited
UNITED STATES PATENTS 2,542,936 2/1951 Miescher et al. _____ 260—473
2,830,074 4/1958 Farinacci _____ 260—468

LORRAINE A. WEINBERGER, Primary Examiner

P. J. KILLOS, Assistant Examiner

U.S. Cl. X.R.

260—476, 488, 514.5, 586, 617.5 999